United States Patent [19]

Dixon

[11] Patent Number: 5,557,898
[45] Date of Patent: Sep. 24, 1996

[54] PNEUMATICALLY DRIVEN FINISH NAIL FOR SECURING A PLANAR MEMBER TO A METAL SHEET SUPPORT

[76] Inventor: Timothy J. Dixon, 215 E. Vine St., Milwaukee, Wis. 53212

[21] Appl. No.: 492,734

[22] Filed: Jun. 20, 1995

Related U.S. Application Data

[63] Continuation of Ser. No. 199,474, Feb. 22, 1994, abandoned.

[51] Int. Cl.⁶ .............................. E04B 5/00; F16B 15/06
[52] U.S. Cl. .......................... 52/410; 52/481.1; 52/408; 411/450; 411/456; 411/922
[58] Field of Search ............................. 52/408, 409, 410, 52/512, 514, 309.12, 481.1; 411/450, 451, 456, 510, 922, 923

[56] References Cited

U.S. PATENT DOCUMENTS

| | | | |
|---|---|---|---|
| 1,100,252 | 6/1914 | O'Neill | 411/456 |
| 1,912,533 | 6/1933 | Madick . | |
| 2,186,684 | 1/1940 | Ritter | 72/18 |
| 2,374,740 | 5/1945 | Gadow | 411/922 |
| 3,010,353 | 11/1961 | Psaros | 411/456 |
| 3,133,326 | 5/1964 | Budny | 20/100 |
| 3,214,875 | 11/1965 | Slowinski et al. | 411/451 |
| 3,477,334 | 11/1969 | Stone et al. | 85/21 |
| 3,505,773 | 4/1970 | Thomas | 52/717 |
| 3,618,447 | 11/1971 | Goins | 411/451 |
| 3,645,163 | 2/1972 | Byland | 85/13 |
| 3,664,080 | 5/1972 | Klingensmith et al. | 52/479 |
| 3,882,755 | 5/1975 | Enstrom | 411/923 |
| 4,109,434 | 8/1978 | Katzin | 52/287 |
| 4,194,336 | 3/1980 | Weinar | 52/481 |
| 4,220,070 | 9/1980 | Anstett | 85/49 |
| 4,338,039 | 7/1982 | Demonty | 403/230 |
| 4,441,295 | 4/1984 | Kelly | 52/408 |
| 4,558,552 | 12/1985 | Reitter, II | 52/410 |
| 4,646,498 | 3/1987 | Schneller et al. | 52/309.12 |
| 4,973,211 | 11/1990 | Potucek | 411/452 |
| 5,195,859 | 3/1993 | Thornton, Jr. | 411/510 |
| 5,253,965 | 10/1993 | Angel | 411/456 |

*Primary Examiner*—Carl D. Friedman
*Assistant Examiner*—Winnie Yip
*Attorney, Agent, or Firm*—Young & Basile, P.C.

[57] ABSTRACT

A wall construction using metal studs upon which wallboard is adhered and wood trim can be applied with a barbed finish nail that has a plurality of barbs along its shank that are flexible to retract axially along the shank as the nail is driven, and expand to catch material and hold the nail in place, wherein the nail further has a low profile head that reduces the amount of finish work required to the applied wood trim.

7 Claims, 1 Drawing Sheet

PNEUMATICALLY DRIVEN FINISH NAIL FOR SECURING A PLANAR MEMBER TO A METAL SHEET SUPPORT

This application is a continuation of application Ser. No. 08/199,474, filed on Feb. 22, 1994, now abandoned.

FIELD OF THE INVENTION

This invention relates generally to the application of wood trim in residential and commercial building construction and particularly to a barbed nail for joining the wood trim to associated wallboard and metal studs.

BACKGROUND OF THE INVENTION

In residential as well as commercial construction there is a great deal of what is termed finish carpentry. Skilled labor is required to perform this type of work and it is very time consuming and therefore very expensive. In view of this, every effort is made to cut corners and to reduce the cost of finish work.

One particular type of finish work that requires a substantial amount of labor and material expense concerns the application of finish carpentry, for example wood trim. The various trim members used in finishing the interior of a building include the casings around doors and windows, baseboard, crown molding, wainscoting, and chair rails. The wood trim serves an aesthetic purpose as well as a functional purpose. It provides a finished look to a room; and it also seals the gaps between the doors, windows, or floors and the adjacent wall.

In residential construction, wood trim is attached to the associated wallboard and wood studs. Wood studs are generally used to form the support base for the wallboard. The use of wood studs allows the wood trim to be quickly and efficiently attached to the wallboard and wood stud by use of a power or pneumatic gun. One disadvantage of using the wood stud support is that in today's construction market an equal length wood stud can cost twice the amount of the metal stud. Another disadvantage of using wood studs is the environmental concern that a continuing lumber demand will promote the deforestation of the country. In addition, wood members are subject to termite infestation which requires chemical treatment of the wood or the surrounding soil. Therefore, there is an economical as well as an environmental incentive to use metal studs in place of wood studs.

Currently, in most commercial construction, metal studs are used because of their inherent strength and non-combustible qualities. The wood trim is attached to the wallboard and a metal stud with screws. Although the application of the wallboard to the metal stud with screws is efficient, the application of wood trim is time consuming. One method of applying the wood trim requires a hole to be first driven through the wood trim, followed by the insertion of a finish head screw through the wood trim, wallboard and metal stud using an electric screw gun, requiring time and expense. The end result is a wood trim having large and rough screw holes which later require an application of wood filler and sanding for a finished job. Another method used to apply wood trim requires gluing the trim to the predetermined location and then shooting smooth shank nails into the wood trim, wallboard, and metal stud with a pneumatic gun. This method is a two-step process requiring expensive labor time. A third method requires shooting a nail into the three layers at a 45° angle. This method does not provide the holding power preferred as in the previous methods. To benefit from the advantages of metal studs, it is necessary to minimize the labor expenditure of applying the finishing touches such as wood trim.

SUMMARY OF THE INVENTION

The present invention addresses the aforementioned problems by providing a method that significantly reduces labor time and cost. In addition, the invention provides a method to reduce material cost by using metal studs rather than the more costly wood studs. Finally, the invention provides a means to attach the wood trim to the wallboard and metal stud to securely hold the members in place, wherein minimal finishing and repair is required to the applied wood trim.

The invention is a method to attach wood trim to the base wallboard and metal stud with a finish nail having a plurality of barbs along its shank. The finish nail has the capability of driving into the three layers of wood trim, wallboard and the metal stud by means of a power or pneumatic finish nail gun in approximately one-tenth the current labor time. The barbed finish nail provides a sufficient holding strength so that the nail is not pulled back out of the metal channel. The barbed finish nail further results in a final appearance that requires minimal touch up repair.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
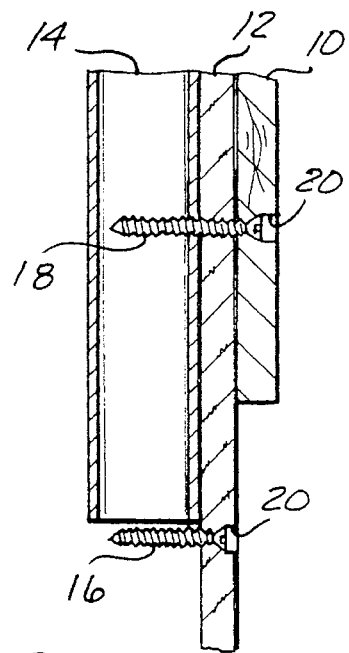
FIG. 1 is a view illustrating the prior art showing screws driven through wood trim, wallboard, and a metal stud.

FIG. 1 illustrates the current method of attaching wood trim 10 onto wallboard 12 and a metal stud 14. Generally, wall construction comprises laterally spacing metal C-shaped studs 14 which have upper and lower ends retained in rigid channel shaped upper and lower tracks (not shown). These tracks may be formed of metal and removably mounted on the ceiling and floor with the open sides of the channel tracks in confronting relationship to receive the respective ends of the metal studs 14. The metal studs 14 are cut to appropriate length and manipulated into the desired position extending between the ceiling and the floor to form a frame. A wallboard panel 12 is positioned against the framing and adjusted to cause the panel edges to fall in approximate centers of the vertical studs 14. The wallboard panel 12 is then mechanically secured to the upper ceiling and lower floor tracks and vertical studs 14 with suitable Teflon® coated drywall screws 16. When using sheet metal studs 14, the procedure of securing the wallboard 12 is accomplished usually with an electric powered screw driver and self-drilling, self-tapping screws. Wood trim 10 can then be attached in a time-consuming process of first driving a hole through the wood trim and then securing the wood trim 10 to wallboard 12 and metal stud 14. The screw 18 causes an unsightly gouge 20 that requires additional time-consuming filling and sanding.

In residential construction, wood framing generally consisting of 2"×4" wood members (not shown) replace the metal studs 14. Wood studs allow the carpenter to shoot nails with a pneumatic gun when attaching the wood trim onto the wallboard and the wood studs. The method of attaching the three layers by means of nails using a nail gun is highly efficient and minimizes labor costs. But in order to save material cost, a suitable method and means to apply wood trim and wallboard to a frame of metal studs is necessary.

Figure 2:
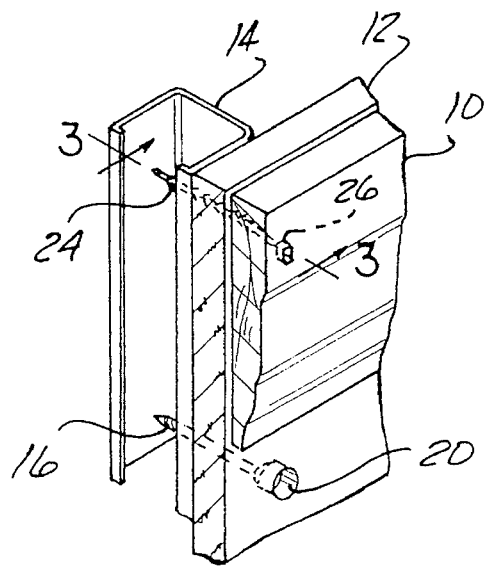
FIG. 2 is a perspective view of a typical metal stud wall assembly utilizing the present invention.
Figure 4:
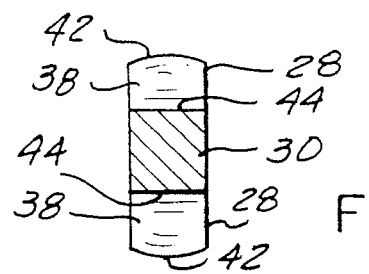
FIG. 4 is a sectional view of the barbed finish nail taken along lines 4—4 of FIG. 3.
Figure 3:
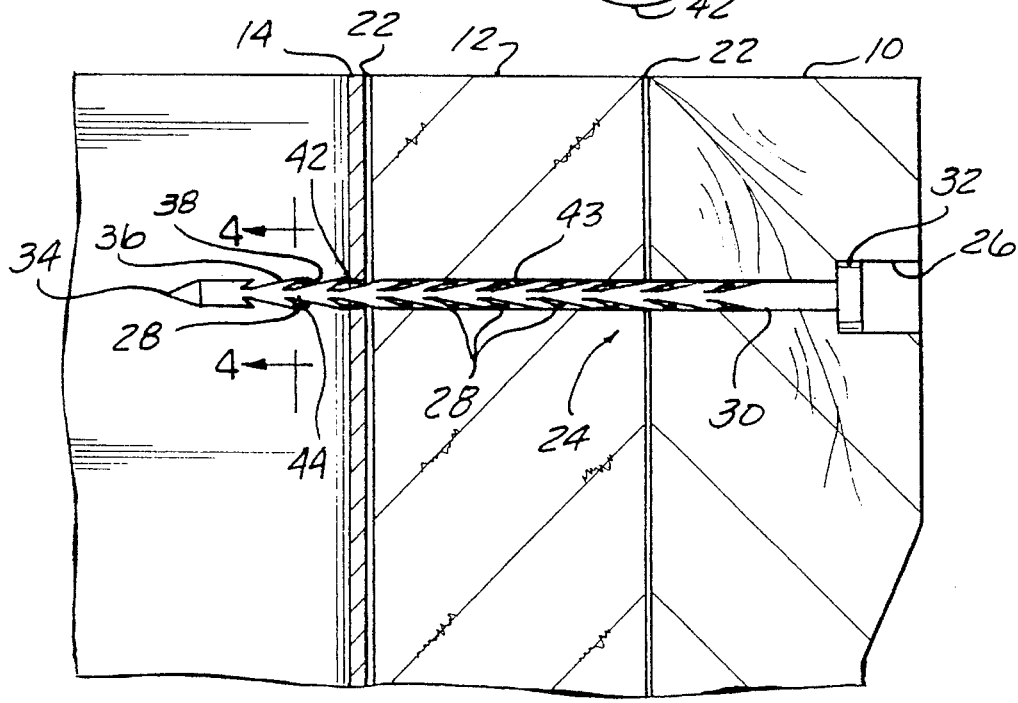
FIG. 3 is a sectional view taken along lines 3—3 of FIG. 2 showing the barbed finish nail.

FIGS. 2–4 disclose a means to apply wood trim 10 and wallboard 12 to a metal stud 14. A wallboard panel 12 is generally made of a high gypsum material. The wallboard 12 has a layer of paper 22 applied to both faces to provide a painting surface. The wallboard 12 is positioned against the metal stud 14 framing and adjusted so that the panel edges fall on the vertical studs 14. The panel 12 is then secured to the upper and lower track (not shown) and vertical studs 14 with suitable Teflon® coated drywall screws 16. This procedure can be accomplished with an electric powered screw driver using self-drilling, self-tapping screws. The wood trim 10 is aligned at the predetermined location after the necessary cutting and fitting has been completed. A barbed finish nail 24 is driven through the wood trim 10, wallboard 12 and metal stud 14 with a pneumatic finish nail gun. This method to apply the wood trim provides a securely held trim that can be applied in a fraction of the time required by the prior art. In addition, the resultant hole 26 in the wood trim 10 is significantly smaller than the gouge 20 left by finish head screws 18 used in the prior art. The labor to fill and sand hole 26 is proportionally reduced to the labor required in the prior art.

Nail 24 generally has the same dimensions and sizes as existing finish nails, but is distinguished from the current finish nail in that the nail 24 has a plurality of flexible barbs 28 running along the shank 30. Existing finish nails are not adequate to secure a material to metal because the finish nails are of such a proportion having a small head and a smooth shank, that the shank is easily moved out of the metal channel to cause dislocation of the wood trim 10 and wallboard 12 from the metal channel 14. On the other hand, it is advantageous to use a nail 24 of the same dimensions and size of a finish nail, because the nails can fit into existing pneumatic nail guns; and the head of a finish nail 24 is such that, when shot into the material, the head is small enough not to form a large gouge 20 that needs extensive resurfacing and sanding.

Nail 24 may be made with standard metallic material such as hardened aluminum or galvanized steel. Referring to FIG. 3, the nail may have a low profile rectangular, square or round flat-topped head 32. Nail 24 has a solid, continuous, one piece shank 30 extending from the head 32 and having a cross-sectional area smaller than the cross-sectional area of the head 32. The shank 30 may have a circular cross-sectional area, but the preferred nail 24 has a flat sided shank 30, resulting in a square or rectangular cross-section, as shown in FIG. 4. A tip 34 is located at a distal end from the head 32 and forms a sharp point for piercing the solid material. Barbs 28 are located preferably parallel to each other along opposing sides of the shank 30. The barbs may also be staggered along the opposing sides of shank 30, or located along one side of shank 30. In the preferred embodiment, the barbs 28 are located approximately three-fourths of the way up the shank 30 from tip 34. It is particularly important to have barbs 28 near the tip 34 to anchor against the metal stud 14. The barbs 28 have flexible pointed surfaces that retract toward the shank 30 in the direction of the head 32 to create an essentially smooth surface 43, axially along the shank 30 as the nail 24 is penetrating the solid material of the wood trim 10, wallboard 12 and stud 14. The smooth surface 43 allows the nail to penetrate the wood trim 10 through the hole formed by tip 34 without damage to the wood material. The barbs 28 are resilient enough to expand outwardly after the barbs 28 have been driven through the metal stud 14 and catch against the inner surface 36 of the metal stud 14 so that the nail 24 cannot be easily withdrawn from the stud 14.

The preferred means to form barbs 28 is to cut a smooth shank finish nail angularly along shaft 30. As seen in FIG. 3, the flexible pointed surfaces of the barbs 38 have outer 36 and inner 38 slanted portions that join to form the barb tips 42. The barb tips 42 may be either rounded (FIG. 4), straight, pointed or other shapes. Each outer and inner slanted portions 36, 38 are separated from another slanted portion 36, 38 along the axial length of the shank 30 by a straight surface portion 44. Straight surface portion 44 should have a length slightly greater than the thickness of the sheet material for metal stud 14, so that stud 14 is disposed along straight surface portion 44 between adjacent barbs 28, but does not allow oscillation of the nail 24.

As nail 24 is driven into the solid layers, the barbs 28 flex toward the straight surface portion 44 of the shank 30 so that inner slanted portion 38 lays approximately adjacent to straight surface portion 44. Barbs 28 that extend beyond metal stud 14 expand so that a pair of parallel barb tips 42 abut inner surface 36 of the metal stud 14. For a particular application, a nail 24 should be used having a length greater than the thickness of the three solid materials so that at least one pair of parallel barbs 28 extend beyond the metal sheet material.

This combination of a new method for installing wood trim onto construction wallboard with the use of a barbed finish nail 24 provides a finished product that is one tenth of the labor cost and one-half of current material cost. In addition, the low profile head 32 of the barbed finish nail 24 requires less finishing work of patching and sanding the wood trim 10 once applied.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A pneumatically driven finish nail, a planar finish member and metal sheet support combination in which the finish nail secures the planar member to a planar portion of the metal sheet support, wherein said planar portion of said metal sheet support has a predetermined thickness, the combination comprising:

the finish nail including a solid, one piece single shank with a small low profile head secured to one end of said shank and said shank having an axial length extending perpendicularly and longitudinally from said head and terminating at a pointed end opposite said head;

said shank having a plurality of flexible barbs extending angularly from said shank, the barbs spaced longitudinally on the shank and having a smooth surface portion of said shank disposed therebetween, said smooth surface portion of said shank disposed between two adjacent longitudinally spaced barbs having a length slightly greater than the thickness of said metal support such that one barb at least engages the planar portion of the metal sheet support and said planar portion of the metal sheet support being disposed in said smooth surface portion, said barbs having a flexibility to retract toward said shank for forming an essentially smooth surface as said barbs penetrate through the planar wood member and the planar portion of the metal sheet support, and said barbs having a flexibility to expand outwardly from a retracted position for non-retractable engagement with the planar portion of the metal sheet support to resist removal of the finish nail from the metal sheet support.

2. The finish nail, planar finish member and metal sheet support combination defined in claim 1 wherein said shank has a generally smooth and non-threaded surface adjacent the head.

3. The finish nail, planar finish member and metal sheet support combination defined in claim 1 wherein the barbs have a slanted inner surface and a slanted outer surface joining to form a barb tip, wherein at least one barb expands and the associated barb tip is in non-retractable engagement with the planar portion of the metal sheet support.

4. The finish nail, planar finish member and metal sheet support combination defined in claim 1 wherein the barbs of the shank are linearly cut from the shank and the barbs have a flexibility to retract toward the shank for forming a continuous and essentially smooth surface.

5. The finish nail, planar finish member and metal sheet support combination defined in claim 1 wherein the planar finish member is a wood material.

6. The finish nail, planar finish member and metal sheet support combination defined in claim 1 wherein the shank has at least two pair of barbs, each pair of barbs having a first barb radially opposite from a second barb.

7. The finish nail, planar finish member and metal sheet support combination defined in claim 6 wherein each pair of barbs has a first barb radially staggered from a second barb.

* * * * *